United States Patent
Oliana

[11] Patent Number: 5,360,299
[45] Date of Patent: Nov. 1, 1994

[54] MACHINE FOR MULTIPLE KEY CODING

[75] Inventor: Pierluigi Oliana, Conegliano Treviso, Italy

[73] Assignee: Orion, S.p.A., Clofosco di Susegana, Italy

[21] Appl. No.: 806,764

[22] Filed: Dec. 13, 1991

[51] Int. Cl.5 .............................................. B23C 3/35
[52] U.S. Cl. .................................................. 409/83
[58] Field of Search ................ 409/83, 82, 81; 76/110

[56] References Cited

U.S. PATENT DOCUMENTS

| | | | |
|---|---|---|---|
| 3,116,665 | 1/1964 | Reisner | 409/83 |
| 3,323,420 | 6/1967 | Roxburgh | 409/83 |
| 3,358,561 | 12/1967 | Roxburgh et al. | 409/83 |
| 3,795,174 | 3/1974 | Oliver et al. | 409/83 |
| 3,796,130 | 3/1974 | Gartner | 409/83 |

*Primary Examiner*—William Briggs
*Attorney, Agent, or Firm*—Ladas & Parry

[57] ABSTRACT

A machine (1) for multiple key cutting comprises a box-like structure (2) which contains a motor for the actuation of a cutter (3) and/or a brush (4). The box-like structure (2) also comprises a clamp (5) for fixing a coded key and a tracer; a support is oscillatably associated with the box-like Structure (2). The support has a first station for the multiple loading of keys to be cut and a second station for removing, conveying and locking the position of a single key to be cut. The second station furthermore allows unloading a single key after it has been cut, and movement of the first or second station with respect to the box-like structure (2). The machine allows one to rapidly obtain numerous identical copies starting from a single coded key.

26 Claims, 7 Drawing Sheets

MACHINE FOR MULTIPLE KEY CODING

The present invention relates to a machine for multiple and single key coding.

Known key coding or cutting machines are usually constituted by a box-like structure containing a motor which is adapted for allowing, generally by means of belts, the actuation of a cutter and of a brush.

A tracer which interacts with a master or already-coded key is furthermore associated with the box-like structure.

A carriage is furthermore oscillatably associated with the box-like structure; said carriage can move transversely or longitudinally with respect to the box-like structure, and two clamps are rigidly associated therewith; the already-coded key is associated with one clamp and the key to be coded is associated with the second clamp, which can be arranged in front of the cutter.

Thus, the operator, after actuating the motor, appropriately moves the carriage so as to duplicate the serrations of the "original" key which interacts with the tracer on the key to be coded by virtue of the action of the cutter.

Said known types of machine have considerable disadvantages if it is necessary to make several copies starting from the same "original" key.

For example, this is the case in which a condominium administrator must prepare a main door key, a gate key etc. for the dwellers.

It is thus necessary to operate the clamp each time in order to secure the key to be coded therein and to disengage it after coding, with considerable expenditure of time.

It has furthermore been observed that the repetitive nature of this operation causes the operator to no longer perform it with the necessary attention: this entails for example an incorrect placement of the key to be coded in the clamp and thus the obtainment of the unusable coded key.

SUMMARY OF THE INVENTION

The aim of the present invention is therefore to eliminate the disadvantages described above by providing a machine which allows one to rapidly and easily code a large number of keys starting from a single original.

Within the scope of the above aim, an important object is to provide a machine which permits one to cut a large number of keys, coded from an original, which are all identical.

Another important object is to provide a machine which associates with the preceding characteristics that of sparing the operator from manual interventions for the positioning and adjustment of the keys to be coded.

Another important object it to provide a machine which is structurally simple and easy to use.

Another object is to provide a machine which associates with the preceding characteristics that of being reliable and safe in use.

This aim, these objects and others which will become apparent hereinafter are achieved by a machine for multiple key coding, comprising a box-like structure which contains a motor for the actuation of a cutter and/or brush, a clamp for fixing a coded key and a tracer, characterized in that a support is oscillatably associated with said box-like structure, said support having a first station for the loading, in a stack, of a multitude keys to be coded and a second station for removing, conveying and locking the position of a single key to be coded from said stack and for unloading the single key after it has been coded, means being provided for moving said first station and/or second station with respect to said box-like structure.

BRIEF DESCRIPTION OF THE FIGURES OF THE DRAWING

Further characteristics and advantages of the invention will become apparent from the detailed description of a particular but not exclusive embodiment of the machine according to the invention, illustrated only by way of non-limitative example in the accompanying drawings, wherein.

DETAILED DESCRIPTION

Figures 10, 11:
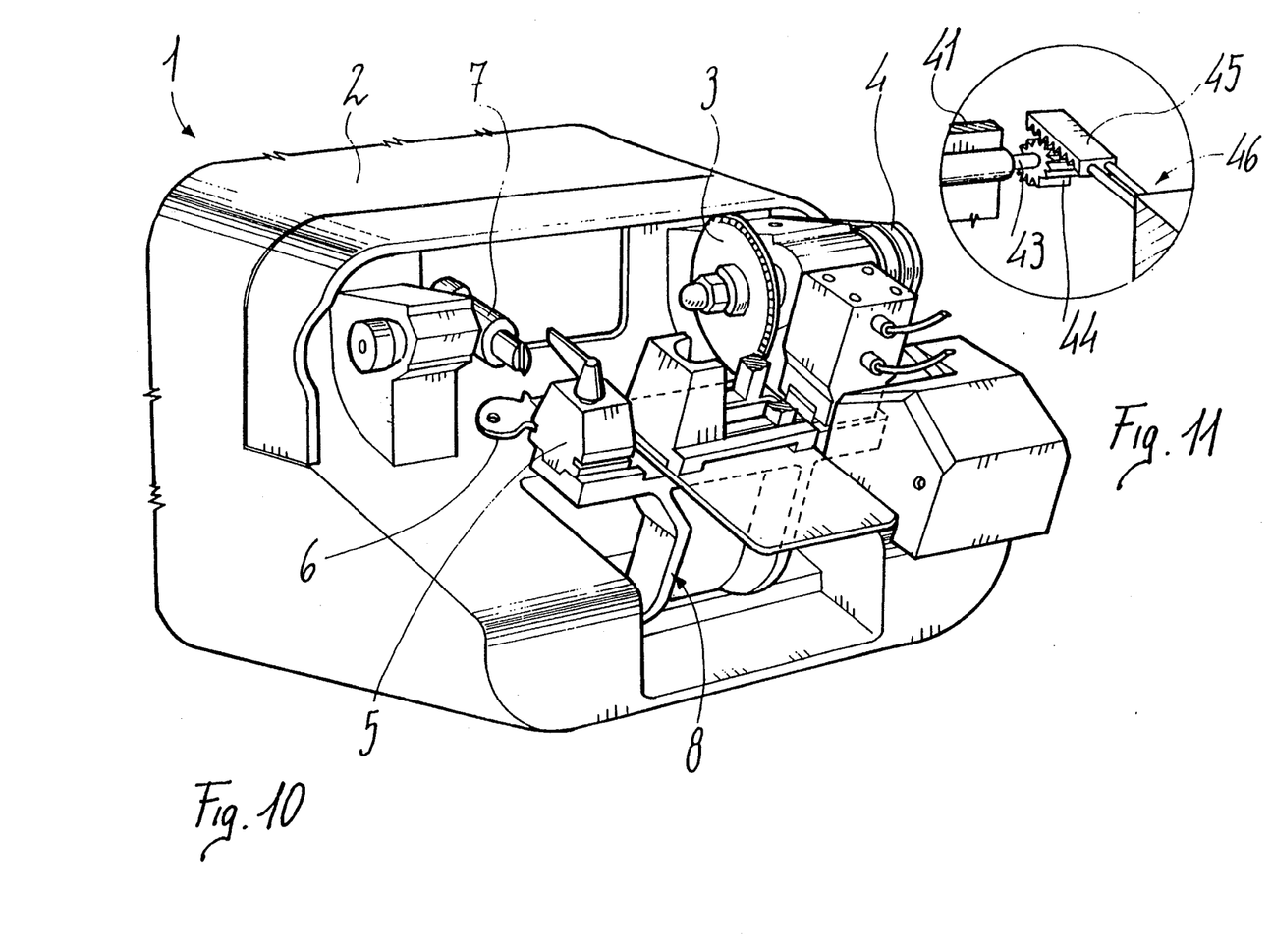
FIG. 10 is a top, side perspective view of the key cutting machine in greater detail with the embodiment of the invention.
FIG. 11 is a detail view of a portion of the machine showing means suitable for allowing one to vary the position of support.

With reference to the above figures, the reference numeral 1 designates a machine for multiple key cutting or coding which comprises a box-like structure 2 which contains a motor, not illustrated in the drawings, for driving a cutter 3 and/or a brush 4 and a clamp 5 (see FIG. 10) for a coded or master key 6 which interacts with a tracer 7 during key cutting.

A pivotal metallic support 8 for clamp 5 is oscillatably associated with the box-like structure 2. A first station 9 and a second station 10 for the keys 11 to be cut or coded are associated with support 8.

The first station 9 allows the multiple loading in a stack of blank keys 11 to be coded and is constituted by an insertion element 12 which comprises, on one side, a first shoulder 13 which is shaped partially complementarily to the head 14 of the key 11 to be coded and comprises, on the other side, a pair of second shoulders 15 which are mutually spaced so as to accommodate the terminal end 16 of the key 11 to be coded.

By virtue of the presence of the first shoulder 13 and of the second shoulders 15, the insertion element 12 allows one to stack a plurality of keys 11 to be coded with different shapes and of different types; the lowermost of said keys in the stack are removed through a first opening 17 defined below the insertion element 12, at the underlying second station 10.

Advantageously, the insertion element 12 has inclined surfaces 18 which are suitable for facilitating the correct placement of the keys 11 to be coded at the opening 17.

At the second station 10 the lowermost key in the stack is removed, conveyed and locked in the clamp 5 so as to allow its subsequent coding; additionally, at said second station 10 the now cut or coded key 6 can be replaced prior to the beginning of the machining of a subsequent key 11.

The second station 10 furthermore comprises a base 19 for removal of the now cut keys 6; above said base 19 there is an intermediate guiding plate 20, and said base 19 is arranged parallel thereto so as to define, between the base and the plate, a compartment 21 which has an opening 22 which is defined on the side opposite the cutter 3 and is suitable for allowing removal of the now coded key 6.

Said intermediate guiding pate 20 furthermore has a third opening 23 which has such a shape as to allow the passage of the coded key 6 into the underlying compartment 21.

A first longitudinal through slot 24 is furthermore provided in the intermediate guiding plate 20 and is interposed between the second opening 22 and the third opening 23.

A pair of third shoulders 25 furthermore protrudes laterally from the intermediate guiding plate 20; said third shoulders are arranged along a longitudinal axis which is parallel to the axis of the first slot 24 and have wings 26a and 26b which are arranged in the same plane, face one another and define guides for a loading plate 27 which is slidingly associated thereat.

An unloading plate 28 is furthermore arranged below guiding plate 20 and adjacent to the base 19, and a second slot 29 is defined therein; said slot 29 has a first portion 30, arranged along a longitudinal axis which is parallel to the axis of the first slot 24, and a second portion 31, arranged along an inclined axis with its terminal end directed toward the cutter 3.

Said unloading plate 28 can move with respect to the intermediate guiding plate 20 along an axis which is perpendicular to the axis of the first longitudinal slot 24.

A third slot 32 is furthermore defined in the underlying base 19 in alignment with said first longitudinal slot and is identical thereto as to dimensions and arrangement.

Figure 8:
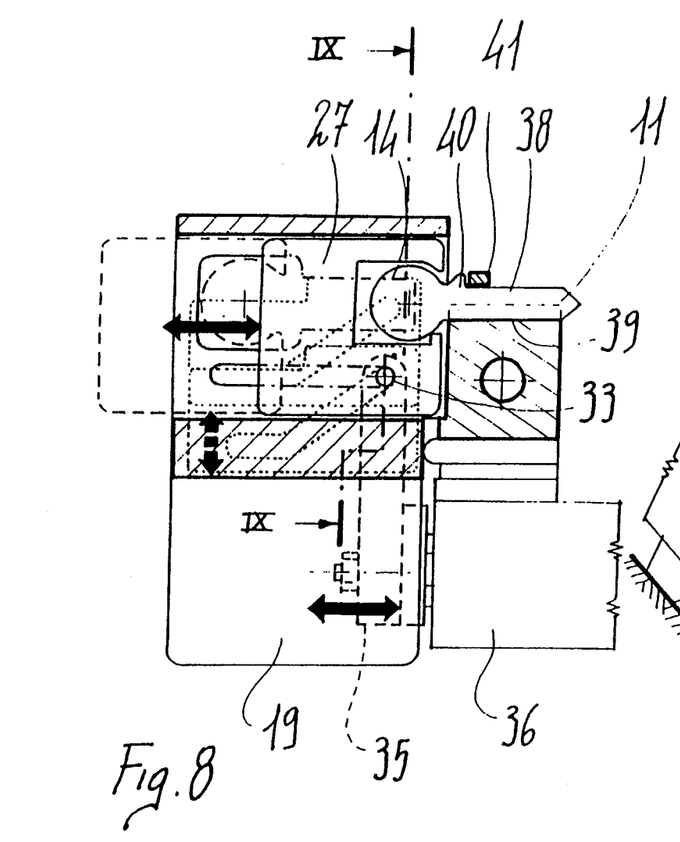
FIG. 8 is a partially sectional view of the machine in the condition illustrated in FIG. 5.

In order to allow the translatory motion of the unloading plate 28 there is a pin 33 which engages in a first hole 34 in the loading plate 27, the underlying first slot 24, the second slot 29, the third slot 32 and then in an arm 35 which can move by means of adapted first actuators 36 (FIG. 8), such as pistons and/or worm screws, which can be associated at the second station 10 or at the support 8.

The configuration of the unloading plate 28 is such as to conceal, during the removal of a key 11 to be coded from the insertion element 12, the third opening 23 in the intermediate guiding plate 20.

A seat 37 is furthermore provided in the loading plate 27, proximate the end adjacent to the overlying second shoulders 15, and is spaced complementarily to, or suitable for accommodating, the head of a key 11 to be coded which passes through the first opening 17 from the insertion element 12 to said loading plate 27.

Figures 1, 2:
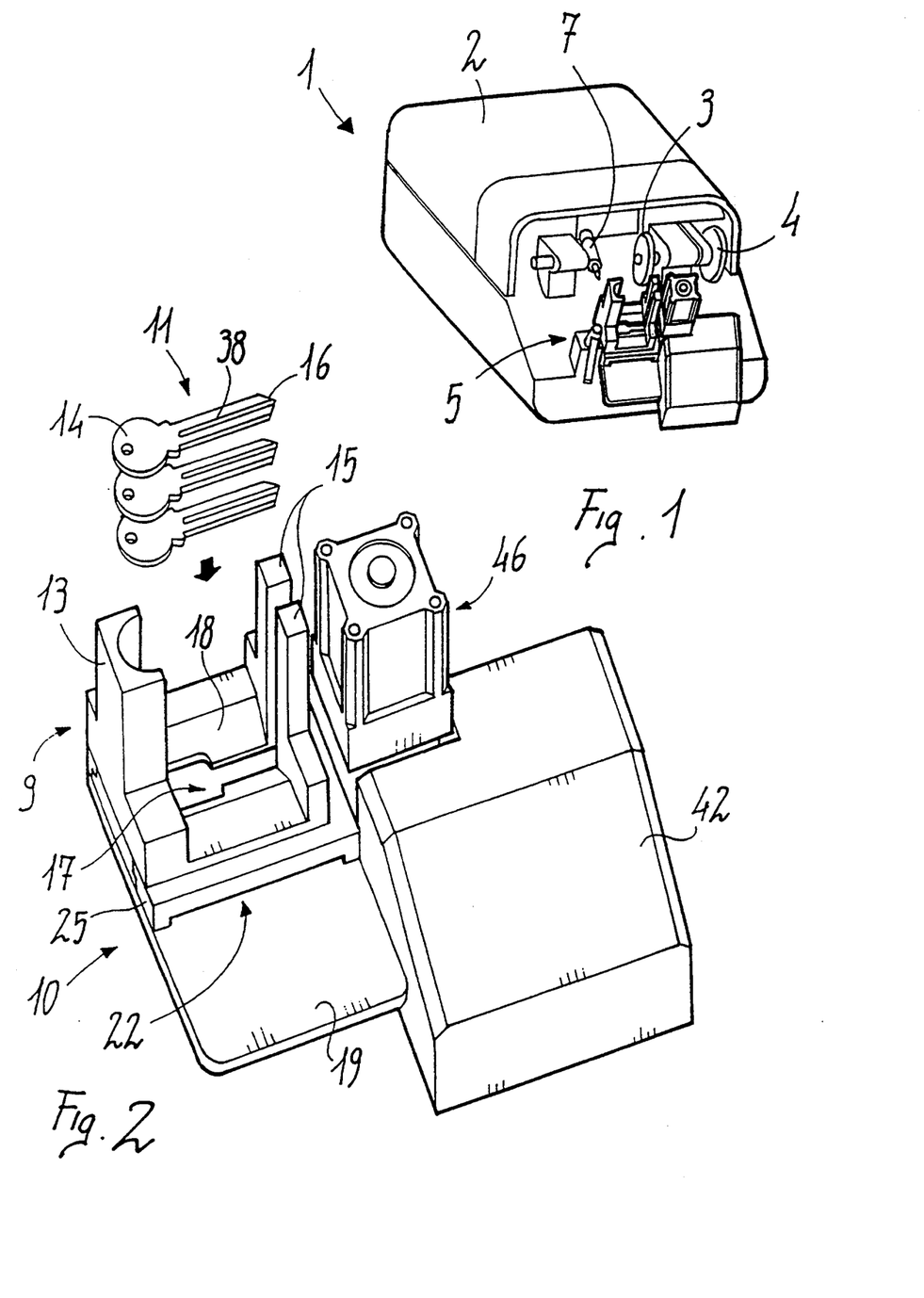
FIG. 1 is a top, side perspective view of a key cutting machine showing an embodiment according to the invention.
FIG. 2 is a top, side perspective view of the first station and of the second station of the machine.
Figure 3:
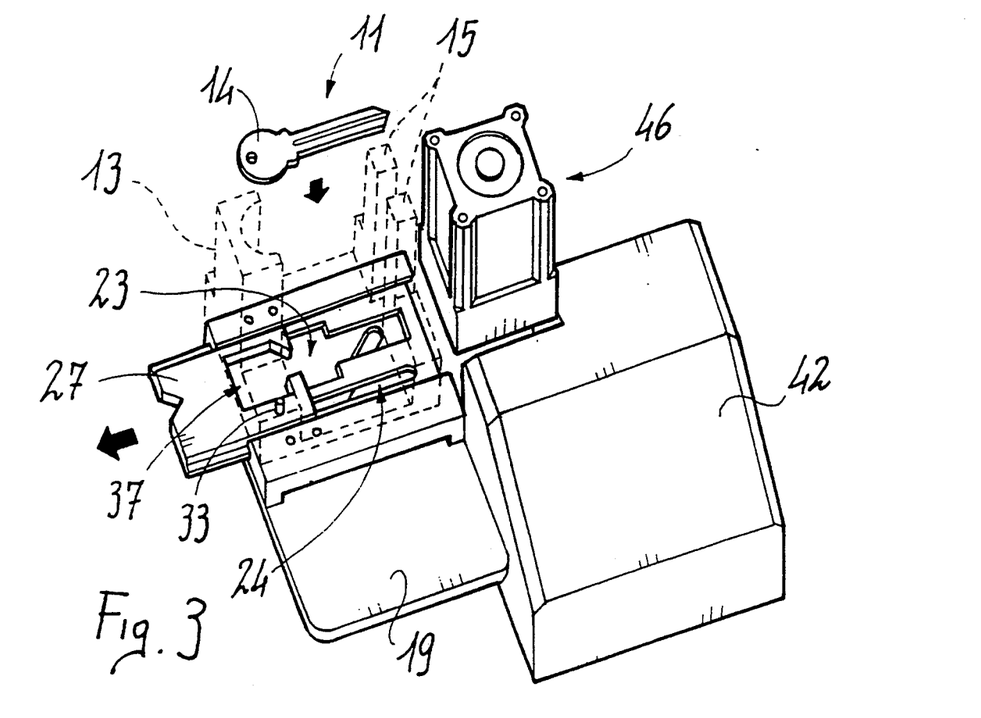
FIG. 3 is a view similar to FIG. 2, wherein a component of the first station has been omitted for the sake of clarity.

In the initial step, illustrated in FIG. 3, the first actuators 36 push the pin 33 in the direction opposite the second portion 31 of the second slot 29 of the unloading plate 28: in this manner the loading plate 27 is moved so as to arrange the seat 37 at the region underlying the first shoulder 13 of the insertion element 12, so as to allow the head 14 of the lowermost key 11 to drop into seat 37, by gravity and due to the weight of the further keys 11 which are stacked above it.

In this position, the unloading plate 28 furthermore closes the third opening 23 in the intermediate guiding plate 20.

Figure 4:
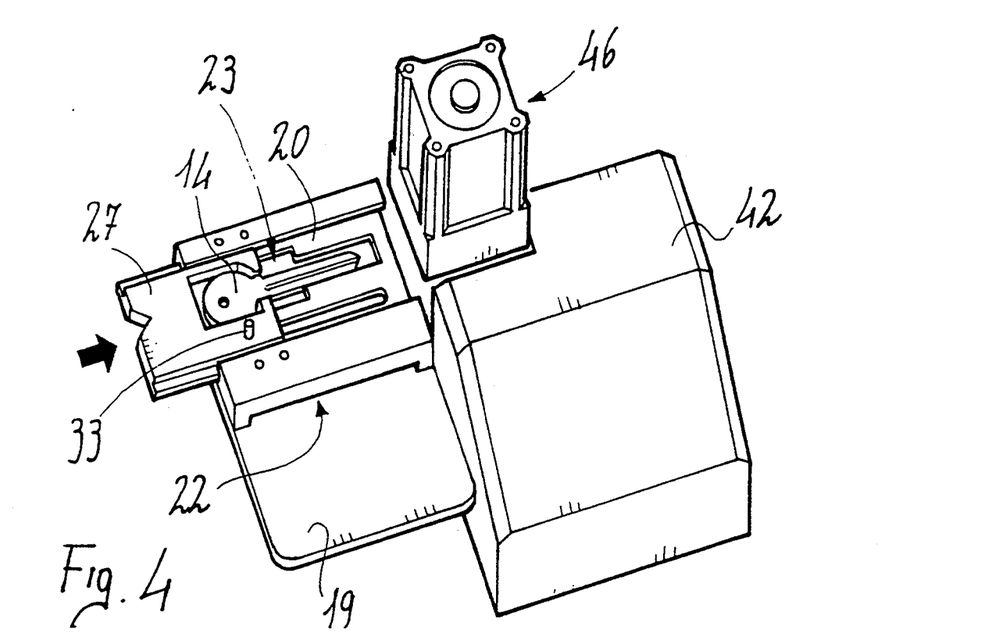
FIG. 4 is a view, similar to FIG. 3, of the condition for the removal of a single key to be coded.
Figure 5:
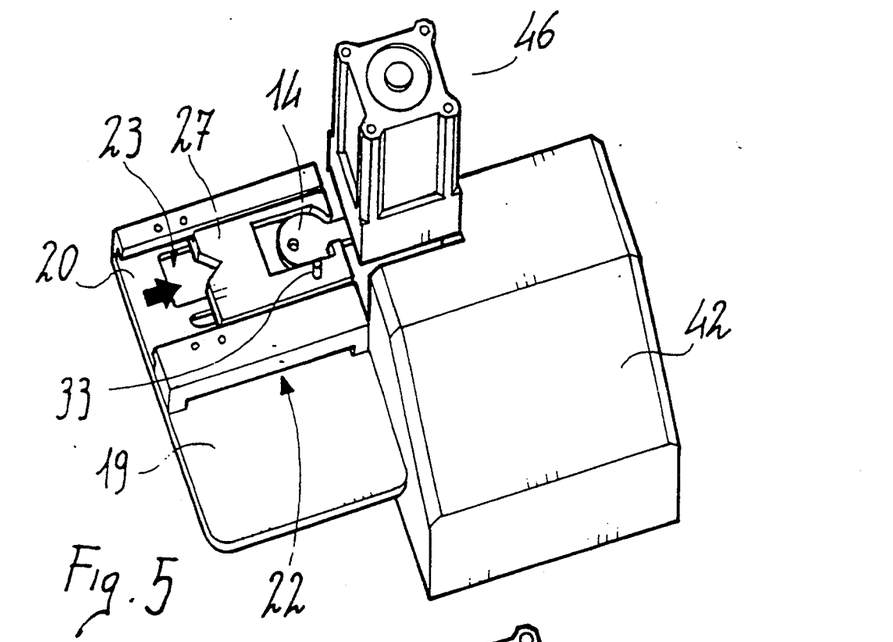
FIG. 5 is a view, similar to FIG. 4, showing the conveyance of the key to be coded.

The first key to be coded, i.e. the lowermost key in the stack in the insertion element 12, is arranged as shown in FIG. 4 in the loading plate 27.

The subsequent step of the use of the machine entails the further activation of the first actuators 36 so as to move the pin 33 approximately to the opposite end of the first slot 24 and therefore of the third slot 32.

In this condition, the blade 38 of the key 11 to be coded is arranged at one side of an abutment plate 39 and can be positioned, on the other side, at the tooth 40, also known as the shoulder of the key connected to the head 14, at a gauge 41 which can move transversely relative to the blade 38 and is associated with the support 8.

The abutment plate 39 is associated with a body 42 which is arranged laterally of the base 19 and possibly supports the first actuators 36.

During this step of the conveyance of the single key 11 to be coded, the gauge 41 is initially spaced from the blade 38.

This is due to the fact that not all keys to be coded have the same head and/or the same blade: this entails the use of loading plates 27 whose seat 37 is shaped appropriately according to the head of the key to be coded.

Advantageously, the seat 37 of the loading plate 27 is shaped so as to accommodate any type of head of keys which can be coded with the machine 1.

Figure 12:
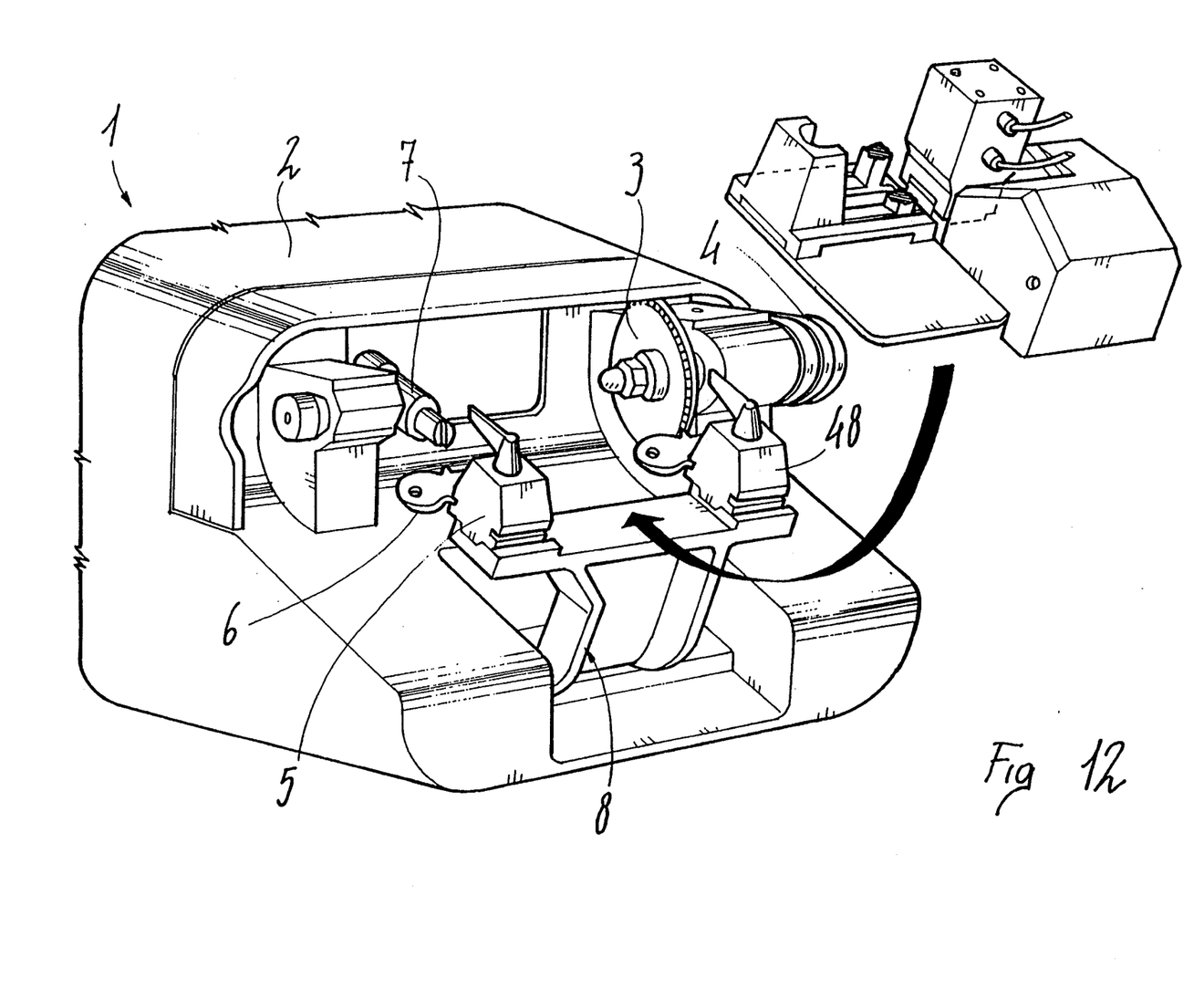
FIG. 12 is a top, side perspective view showing a different use of the machine.

The gauge 41 can thus move along an axis which is transverse relative to the blade 38: the gauge is in fact moved by a shaft 43 (FIG. 12) which has, at one end, a gear 44 which is rotated in both directions by the reciprocating motion of a rack 45 which is actuated by means of second actuators 46 which are accommodated within the body 42.

Advantageously, the step for the conveyance of the key to be coded provides that when the terminal end 16 of said key begins to affect the abutment plate 39 the gauge 41 is open, i.e. spaced from the blade.

Subsequently, as the key is moved, the closure of the gauge is actuated, and said gauge moves adjacent to the blade 38 until the tooth 40, also known as the key shoulder, abuts thereon. Then the blade of the key will be in a determined position in readiness for clamping.

Figure 9:
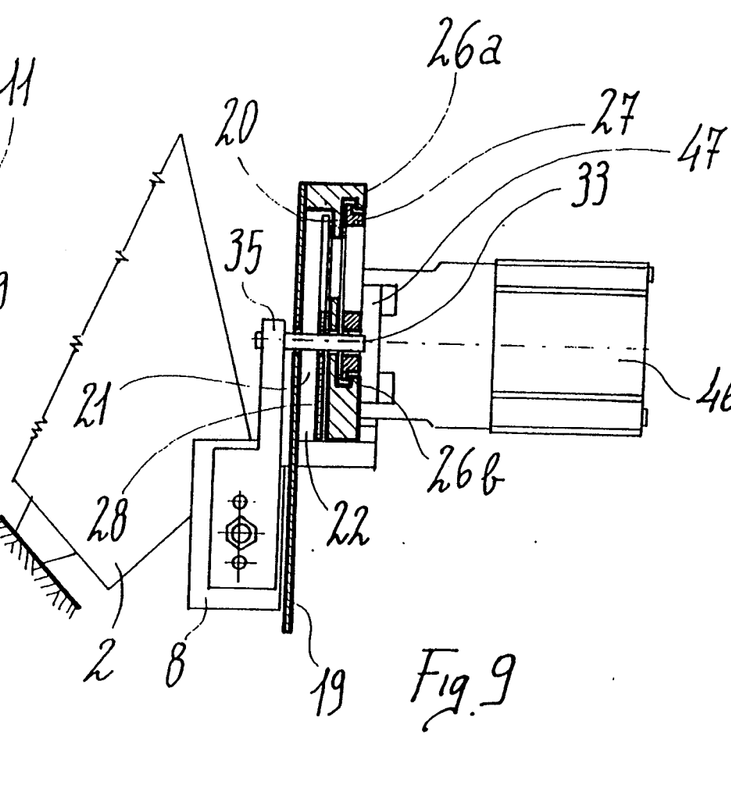
FIG. 9 is a sectional view taken along line IX—IX in FIG. 8.

After a preset time, the activation of third actuators 46 follows; said third actuators are arranged above the body 42 and position an adapted plate 47 (FIG. 9) so as to clamp the blade 38 of the key 11 to be coded.

Once said key to be coded has been locked, the gauge 41 is reopened, thus allowing cutting of the key.

Once key cutting has ended, a command is given to the third actuators 46 so that the blade of the key, which is now coded, is no longer clamped by the plate 47.

Figure 6:
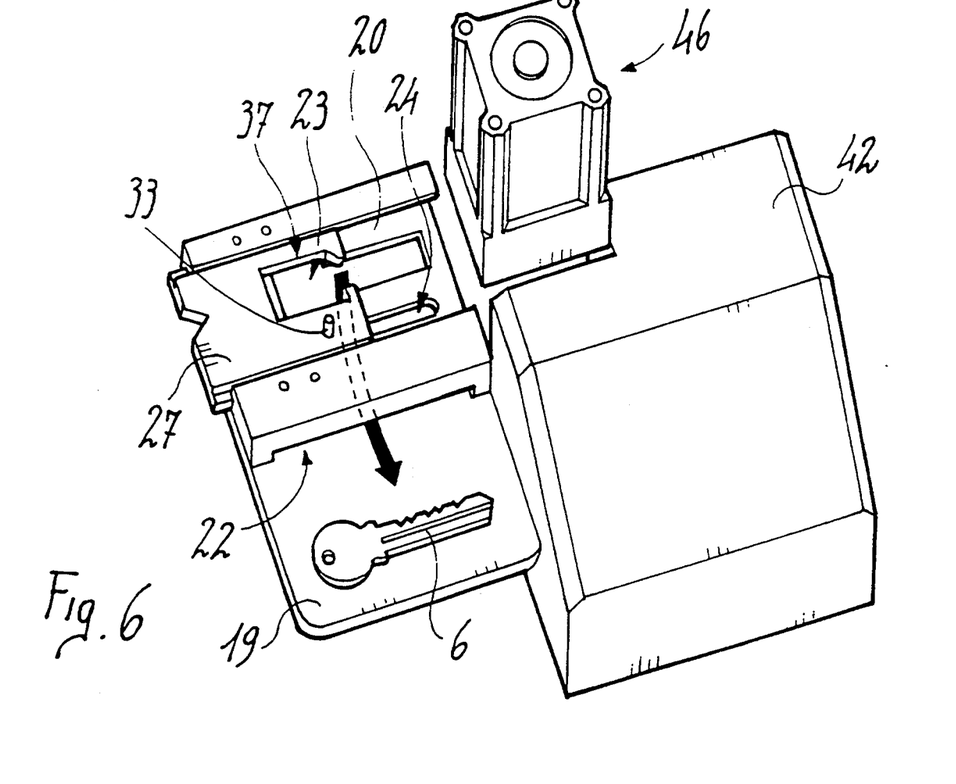
FIG. 6 is a view, similar to FIG. 5, showing the state of the first station in the unloading of a single coded key.
Figure 7:
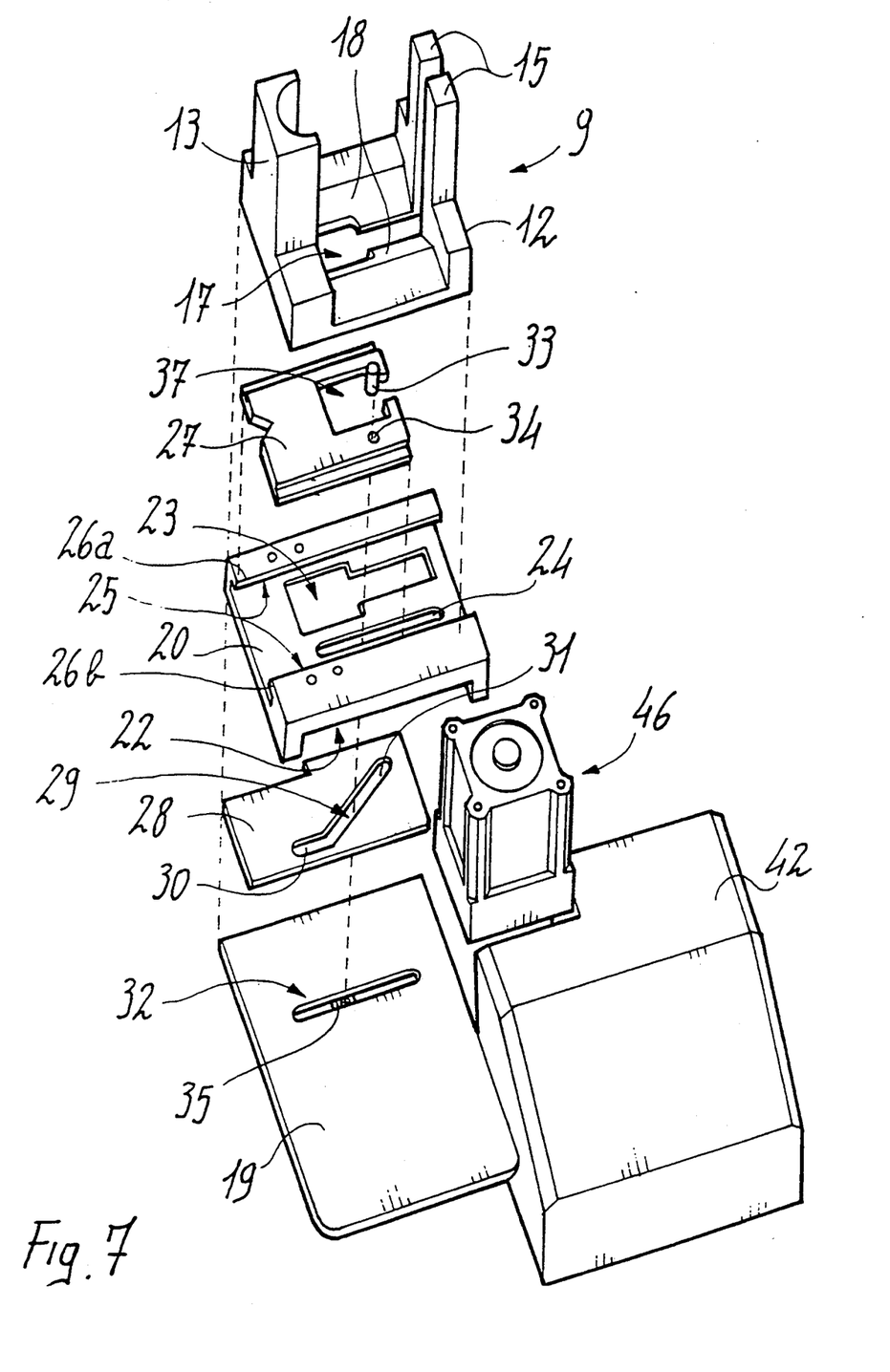
FIG. 7 is an exploded view of the components of the first station and of the second station.

A command is subsequently sent to the first actuators 36 in order to transmit motion to the pin 33 and thus to the loading plate 27 so as to extract the now coded key from the abutment plate 39; simultaneously, due to the shape of the second slot 29, the unloading plate 28 moves transversely relative to the first longitudinal slot 24, so as to allow the third opening 23 in the intermediate guiding plate 20, to overlap the seat 37 in the loading plate 27, as illustrated in FIG. 6.

In this manner the coded key 6 "falls" into the underlying compartment 21 and thus onto the base 19, through the second opening 22.

It has thus been observed that the invention has achieved the intended aim and objects by providing a machine which allows one to rapidly and easily code a large number of keys, all having the same characteristics, starting from a single master or original.

The machine furthermore spares the operator from manual interventions for the positioning and adjustment of the keys to be coded, which occur automatically so as to ensure excellent uniformity in the repetitiveness of the coding.

Finally, the first station and the second station are extremely compact and can thus be applied even to conventional machines instead of the second clamp arranged in front of the cutter.

The fact is furthermore stressed that since it is not always necessary to code keys in a multiple sequence, the assembly constituted by the first station and the second station may be removable from the machine 1, and clamp 48 may be repositioned in its place and be arranged in front of the cutter 3, all by virtue of adapted means such as, for example, pins which can be inserted in complementarily shaped seats on the support 8.

By using clamp 48 it is possible to code the keys individually, such as, for example, in the case of car keys, which have a plastic head and seldom need to be duplicated in large quantities.

The invention is naturally susceptible of numerous modifications and variations, all of which are within the scope of the same inventive concept.

Thus, the assembly constituted by the first station and the second station can also be mounted on electronic-control machine as well as on mechanical units.

The materials and dimensions which constitute the individual components of the machine may naturally be the most appropriate according to the specific requirements.

I claim:

1. Apparatus for cutting a multiple number of stacked, blank keys one at a time in conformity with a master key, the apparatus having cutting means for cutting a blank key, clamp means for holding the blank key during cutting, and tracer means for following a master key to control the cutting means to cut the blank key, the improvement comprising a pivotal support having a first station for stacking a plurality of blank keys to be cut, a second station at which the blank keys after cutting are received, means at said second station for transporting the lowermost key in said stack to the clamp means for the cutting of said lowermost key and for transporting the key after cutting back to said second station, an insertion element at said first station for the stacking of the plurality of blank keys thereon, said means for transporting the lowermost key in the stack to the clamp means and for transporting the key after cutting back to said second station comprising a loading plate below said insertion element for receiving the lowermost key in said stack, said loading plate being slidable relative to said insertion element to displace said lowermost key to said clamp means for a key cutting operation and to displace said key, after cutting, from said clamp means to said second station, said loading plate having an opening shaped to accommodate the head of the lowermost key in the stack with the blade of the key projecting from the loading plate, the shape of said opening being such as to accommodate various types and sizes of heads of the keys, and means, including an intermediate guide plate slidably supported beneath said loading plate, for blocking passage of the lowermost key in said stack of blank keys and for permitting passage of the now cut key from said loading plate for removal at said second station.

2. The improvement as claimed in claim 1, further comprising means for engaging the projecting blade of the key to be cut so that the blade is engaged in a determined position in said clamp means.

3. The improvement as claimed in claim 2, wherein said means which engages the projecting blade of the blank key to be cut comprises an abutment plate for engaging one side of said projecting blade and a displaceable gauge at the other side of said projecting blade.

4. The improvement as claimed in claim 1, wherein said insertion element comprises a first upright shoulder having a shaped surface for loosely receiving a portion of the heads of the keys in said stack and a second upright shoulder spaced from said first shoulder and defining a space in which terminal ends of the blades of the keys in the stack are received.

5. The improvement as claimed in claim 4, wherein said second shoulder comprises a pair of spaced shoulder members defining said space which receives the terminal ends of said blades in said stack.

6. The improvement as claimed in claim 1, comprising means below said insertion element defining an opening through which the cut key can fall for removal at said second station.

7. The improvement as claimed in claim 6, comprising a base at said second station onto which the cut key falls after passing through said opening, said intermediate guide plate being above said base and parallel thereto to define a compartment therebetween having a second opening at a side of said compartment.

8. The improvement as claimed in claim 7, wherein said intermediate guide plate has a third opening with a shape to permit the cut key to pass therethrough into said compartment.

9. The improvement as claimed in claim 8, wherein said intermediate guide plate has a first longitudinal slot between said second and third openings.

10. The improvement as claimed in claim 9, wherein said intermediate guide plate includes a pair of shoulders extending parallel to said first slot and including respective wings extending in a common plane in facing relation to serve as guides, said loading plate being slidable in said guides.

11. The improvement as claimed in claim 10, wherein said means for blocking passage of the lowermost key in said stack and permitting passage of the cut key further includes an unloading plate arranged below and adjacent to said intermediate guide plate, a second slot in said unloading plate, said second slot having a first portion which is parallel to said first slot and a second portion which is inclined relative to said first portion.

12. The improvement as claimed in claim 11, wherein said unloading plate is supported for movement with respect to said intermediate guide plate in a direction perpendicular to said first slot.

13. The improvement as claimed in claim 12, wherein a third slot is provided in said base in correspondence with said first slot and with the same dimensions and arrangement.

14. The improvement as claimed in claim 13, further comprising means for moving said unloading plate comprising a pin engaged in a first hole provided in said loading plate and in said first, second and third slots, a movable arm to which said pin is fixed, and first actuator means for moving said arm.

15. The improvement as claimed in claim 14, wherein said unloading plate is constructed to obscure said third opening in said intermediate guide plate during the removal of the lowermost key in said stack in said insertion element.

16. The improvement as claimed in claim 15, wherein said opening in said loading plate is proximate to an end of said loading plate adjacent to said second shoulder members on the overlying insertion element.

17. The improvement as claimed in claim 16, wherein said first actuator means engages said pin to displace the same, in a preliminary phase, in a direction opposite said second portion of said second slot in said unloading plate to move said loading plate to a position in which the opening in said loading plate is adjacent to said first shoulder of said insertion element to allow the head of the lowermost key in said stack to drop into said opening in said loading plate, said unloading plate closing, in this condition, said third opening in said intermediate guiding plate.

18. The improvement as claimed in claim 17, wherein said first actuator means displaces said pin in the direction of said second portion of said second slot until the blade of said key is arranged adjacent to an abutment plate, a gauge being disposed opposite said abutment plate and being movable transversely relative to said blade for temporarily abutting against a shoulder of the blade.

19. The improvement as claimed in claim 18, wherein said gauge is initially spaced from said blade during the conveyance of said key and abuts against said shoulder when a terminal end of said key contacts said abutment plate.

20. The improvement as claimed in claim 19, comprising a shaft connected to said gauge, a gear on said shaft and a rack engaged with said gear to rotate the gear in both directions with a reciprocating motion and second actuator means for displacing said rack.

21. The improvement as claimed in claim 20, comprising third actuator means for operating said clamp means to clamp the key to the cut after said second actuator means has moved said gauge away from said blade of the key.

22. The improvement as claimed in claim 21, wherein after key cutting is completed, said third actuator means unclamps the key and then said pin and said loading plate extract the cut key by activation of said first actuator means to displace the key above said third opening in said intermediate guide plate so that the key can drop from said loading plate through said third opening which is now unblocked by said unloading plate.

23. The improvement as claimed in claim 22, comprising a body supporting said abutment plate, said body being arranged laterally of said base.

24. The improvement as claimed in claim 23, wherein said first actuator means is supported on said body.

25. The improvement as claimed in claim 1, wherein said insertion element has a lower opening of a size and shape to permit the lowermost key in the stack to pass therethrough, said loading plate being slidable between one position in which the loading plate covers the lower opening in the insertion element to prevent the lowermost key from being received by the loading plate, and a second position in which the opening in the loading plate registers with the opening in the insertion element to enable the lowermost key in the stack to be received by the loading plate.

26. The improvement as claimed in claim 25, wherein said insertion element has inclined faces at said opening in the insertion element to guide and position the keys in the stack at said opening in the insertion element.

* * * * *